UNITED STATES PATENT OFFICE.

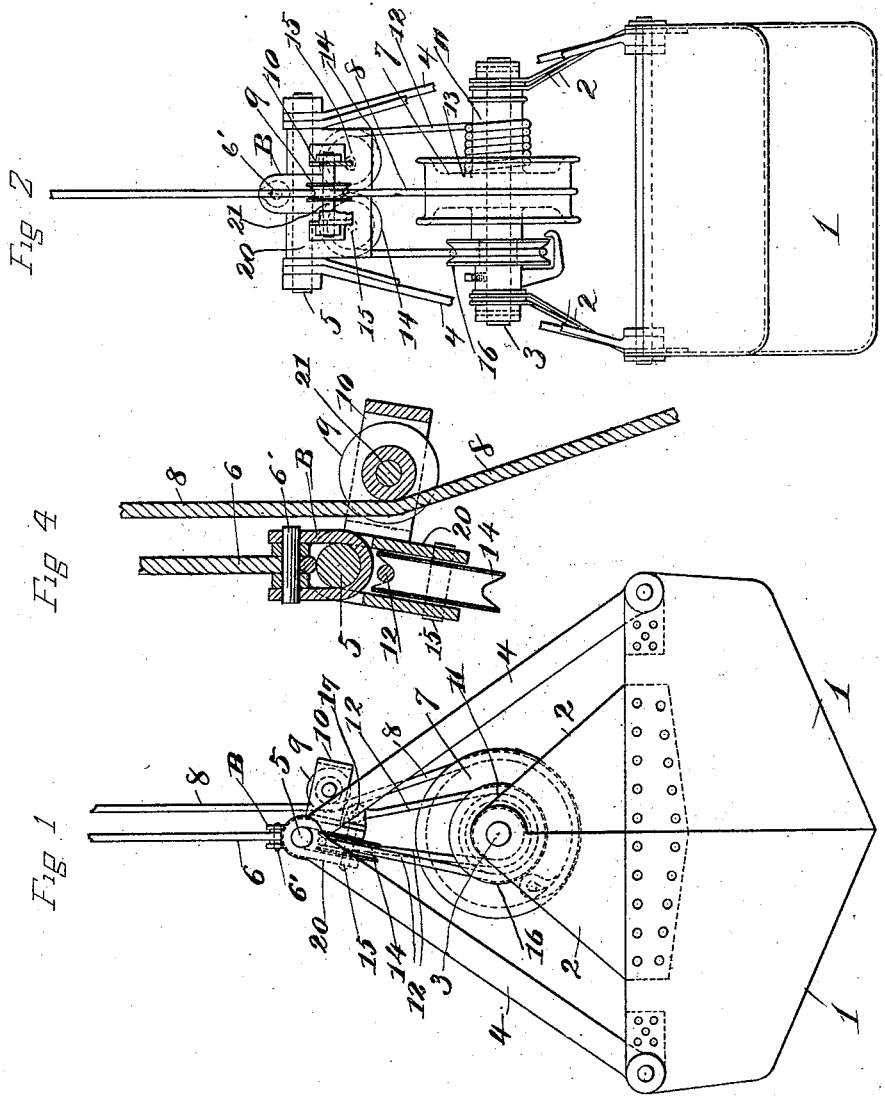
E. F. ATHERTON.
CLAM SHELL BUCKET.
APPLICATION FILED APR. 21, 1908.
916,965.
Patented Apr. 6, 1909.
2 SHEETS—SHEET 1.

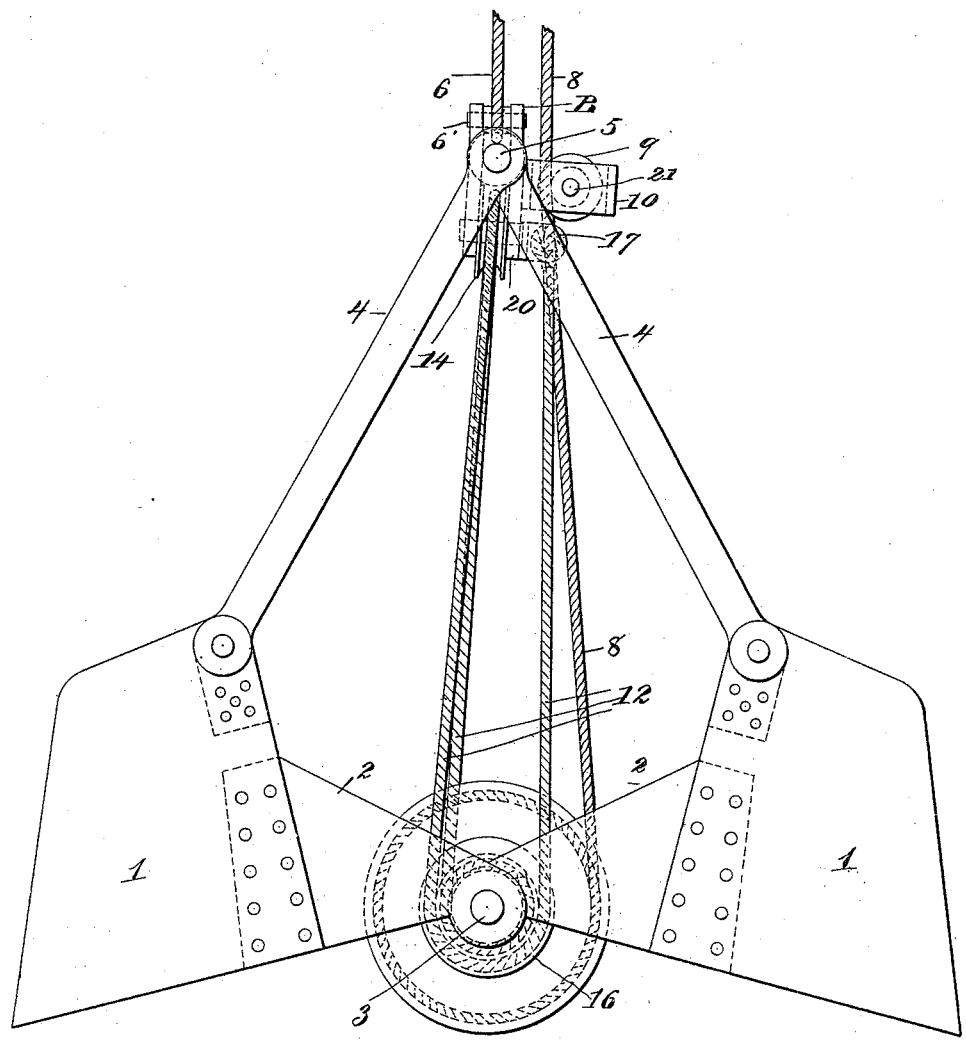

EDMOND F. ATHERTON, OF CLEVELAND, OHIO.

CLAM-SHELL BUCKET.

No. 916,965.   Specification of Letters Patent.   Patented April 6, 1909.

Application filed April 21, 1908. Serial No. 428,404.

*To all whom it may concern:*

Be it known that I, EDMOND F. ATHERTON, a citizen of the United States, and resident of Cleveland, in the county of Cuyahoga and State of Ohio, have invented certain new and useful Improvements in Clam-Shell Buckets, of which I hereby declare the following to be a full, clear, and exact description, such as will enable others skilled in the art to which it appertains to make and use the same.

The objects of the invention are to provide means for obtaining an increased power in the closing means for a clam shell bucket in which two scoop members are drawn forcibly together through the material to be raised in order to inclose the load.

Further objects are to provide forms of mechanism for operating the bucket in which the strains upon a single rope which is employed to close the scoop members together are equalized as well as increased, so that all portions of the rope pull alike and no danger of breakage of the rope is incurred.

The invention is further designed to include as few parts as possible and to be simple and inexpensive in construction as well as efficient in use.

The bucket relates to that class in which the scoop members are provided with arms at their inner edges, which are pivoted together upon a common axial or bucket shaft, and in which the outer edges of the buckets are supported by means of bail arms, pivoted together by means of a pin or shaft at their upper ends on the center line of the buckets, and in which the holding and overhauling rope is attached to the pivotal pin of the bail arms, and the power for closing the scoop members of the bucket together is obtained by means of a main drum mounted upon the bucket shaft, a rope wound thereover, and two closing ropes wound upon smaller drums extended laterally from said main drum and having separate purchase points upon the bail arms or pivot pin therefor. In this device however, in lieu of the two minor drums and two closing ropes thereon, only one minor drum is employed and only one closing rope thereon in addition to the main drum and operating rope therefor and the closing rope upon the minor drum, by means of which increased power is obtained, is carried over pulleys upon the bail pin, or relatively stable portion of the device, and thence over an idler mounted upon the bucket shaft or the opposite side of the main drum, and preferably terminating in a dead end or purchase point at or in the vicinity of the bail pin. In this manner one drum and rope can be dispensed with and an enormous gain in power obtained, and the greatest advantage is obtained in the prevention of unequal strains upon the rope which constantly occurred when two ropes and drums were employed, since any irregularity in winding of one rope upon its drum would make the ropes pull unevenly and break one of them.

The invention further comprises the peculiar forms of construction of the bail frame and the combination and arrangement of parts as hereinafter described, illustrated in the accompanying drawings and specifically pointed out in the claims.

In the accompanying drawings, Figure 1 is a side elevation of the bucket showing the scoop members closed; Fig. 2 is an edge elevation of the same; Fig. 3 is a side elevation showing the scoop members widely opened in the position for receiving its load; Fig. 4 is a transverse section of the bail pin and bail frame, showing guide and power pulleys.

In these views 1, 1 are the scoop members of the bucket provided with arms 2, 2 attached to their inner edges. These arms are pivoted upon the bucket shaft 3, and the scoop members are pivoted at their outer edges to arms 4, 4, pivoted together at their upper ends by means of the bail pin 5. The holding rope 6 is attached to the pin 6' mounted on the bail B, passed over the bail pin 5. Upon the bucket shaft 3 is shown the main drum 7, upon which is wound the rope 8 by means of which the scoop members are manipulated and it also passes over a guide pulley 9 on the plate 10 above. At one side of this main drum and secured thereto or integral therewith is shown the minor drum 11 upon which the closing rope 12 is wound, which preferably has a dead end 13 thereon or on the side of the larger drum.

The closing rope after passing over the closing drum, passes thence over the pulleys 14, 14 pivoted at 15, 15 upon the pendent frame or support 20 which is in turn pivoted upon the bail pin 5 so as to swing freely thereon. These pulleys 14, 14 carry the rope 12 over the main drum and from these pulleys the rope 12 passes over an idler 16 mounted independently upon the bucket shaft 3, or on a sleeved extension from the main drum, so as to turn freely thereon, and from thence passes preferably to a dead point 17 upon the frame above. The pendent frame will accommodate itself to the swing of the bucket.

It will readily be observed that by pulling on the operating rope 8 the main drum will be revolved and by this means the closing rope 12 will be wound upon the smaller drum which is to be one third of the diameter of the large drum in size. To this increase in power is added the doubling of the rope about the pulleys 14, 14 and the second doubling about the idler 16, thus providing a closing power of approximately nine to one. Added power could be given by increasing the number of the pulleys without departing from the spirit of the invention, the leading feature of which is the increased power obtainable from the use of a single closing rope, and the free training obtained thereby by the use of the idler on the shaft in lieu of a second closing drum and second closing rope.

The pendent frame or support 20 upon which the pulleys 14, 14 and guide pulley 9 are mounted is a simple structure composed of a plate bent to form parallel sides and looped over the bail pin. The bail B is shown to be a smaller plate with the sides bent upward and provided with a bail pin 6'. The guide roller 9 is mounted in a similar plate 10 riveted to the side of the frame and the pulley is permitted to move freely from side to side on its pivot pin 21 as the rope winds upon the drum so that the winding will be regular thereon.

The number of the pulleys by means of which the closing rope obtains a purchase in the saddle may be reduced or increased, and the relative sizes of the drums altered, without departing from the spirit of the invention.

Having described the invention what I claim as new and desire to secure by Letters Patent is:—

1. In a clam shell bucket, provided with scoop members pivoted together at their inner edges and with bail arms pivoted to their outer edges and pivoted together at their upper ends, a frame on said bail shaft, a bucket shaft, upon which said scoop members pivot, a main drum and a minor drum, at one side thereof, said drums secured together and mounted on said bucket shaft, a closing rope upon said minor drum, a pulley upon said frame over which said closing rope passes, an idler on the bucket shaft over which said closing rope passes, and a purchase point upon the said frame for said closing rope.

2. In a clam shell bucket provided with scoop portions, a common bucket shaft on which the inner ends of said scoop portions are pivoted, and bail arms pivoted together at their upper ends and to the outer edges of the scoop portions at their outer edges, the combination therewith of a large drum upon the bucket shaft, a smaller drum secured to said large drum at one side thereof an idler upon said bucket shaft, a frame overhead pulleys upon the said frame, a holding rope upon said frame, an operating rope passing around said large drum, a closing rope passing around said smaller drum, said closing rope passing over said overhead pulleys and over said idler and having a purchase point in said frame, substantially as described.

3. In a clam shell bucket, the combination with scoop portions pivoted together at their inner edges, of a common pivotal drum shaft therefor, bail arms pivoted together at their upper edges, and at their lower edges pivoted to the outer edges of said scoop portions, a frame upon the upper bail arm pivot, a large and a small drum secured together and pivoted upon said drum shaft, and a closing means for said scoop portions comprising a single closing rope passing over said smaller drum and having purchase points upon said frame and upon the said bucket shaft on the other side of said large drum, an equalizing means for said closing rope, and an operating rope passing over said large drum.

4. In a clam shell bucket, in combination, with a pair of scoop members pivoted together at their inner and upper edges, a common pivot shaft therefor, and bail arms pivoted to said scoop members at their outer edges and a bail arm shaft pivotally connecting the upper ends of said bail arms, a pulley support on said bail shaft, and a closing means for said scoop portions comprising, an operating drum upon the common pivot shaft for the scoop members, a smaller closing drum on said operating drum, elevated pulleys on the said pulley support and a loose pulley on the said common pivotal shaft located on the opposite side of the operating drum from the winding drum, a single closing rope passing over said closing drum, elevated pulleys and loose pulley and having a final purchase in said pulley support, an operating rope upon said operating drum, and means for holding said bucket.

5. In a bucket frame, in combination, a bail arm shaft, a saddle thereon, and a bail on said shaft, the said saddle being cut away to provide an opening for said bail, said saddle serving as a pulley support.

6. In a bucket having scoop sections pivoted together and bail arms supporting the same, a bail arm shaft pivotally connecting said bail arms, a saddle upon said bail arm shaft comprising a sheet of metal bent around the shaft and provided with a central opening, a bail upon said shaft, located in said opening and pulleys pivoted between the depending sides of said bent plate, and a guide pulley secured for limited lateral movement upon one side of said frame.

In testimony whereof I hereunto set my hand this 18th day of April 1908.

EDMOND F. ATHERTON.

In presence of—
 GEO. S. COLE,
 WM. M. MONROE.